March 18, 1958     R. G. JEWELL     2,827,338
VIBRATION-COMPENSATED SUSPENSION
Filed Sept. 29, 1955
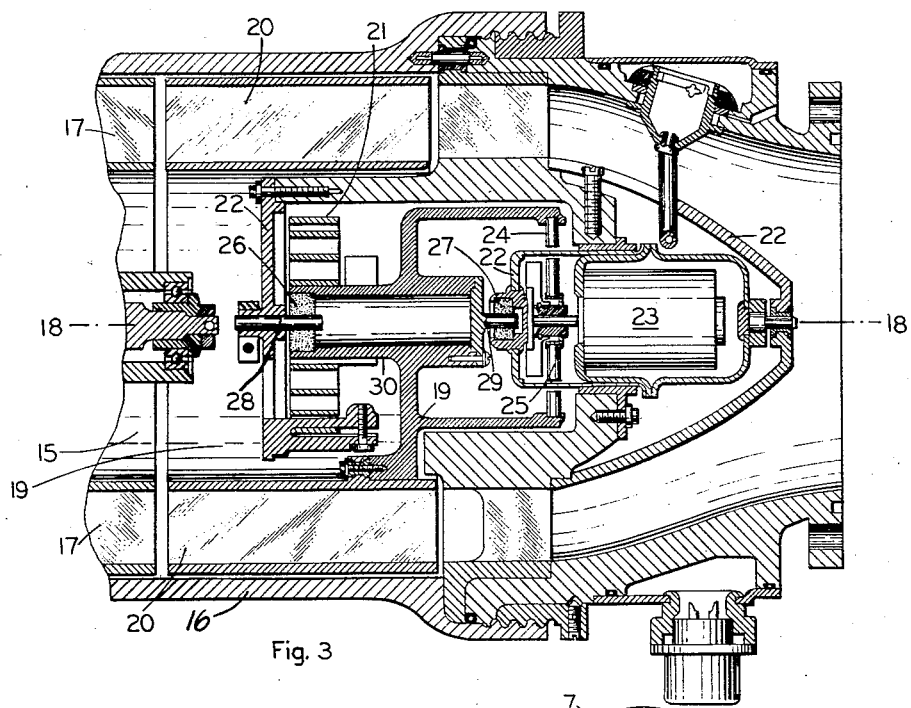
Fig. 3
Fig. 1
Fig. 2
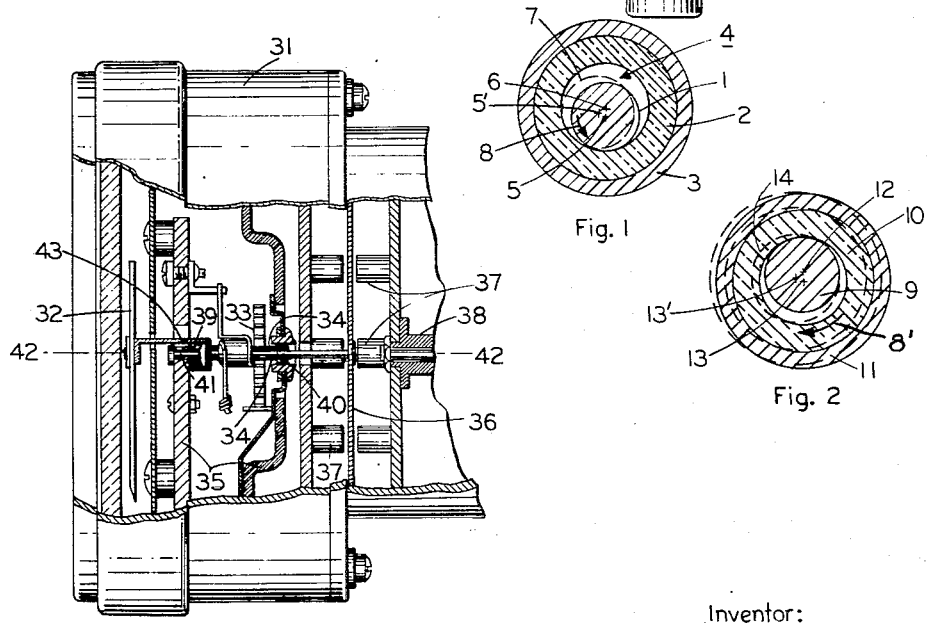
Fig. 4
Inventor:
Richard G. Jewell.
by, Richard E. Horley
His Attorney

United States Patent Office 2,827,338
Patented Mar. 18, 1958

2,827,338

VIBRATION-COMPENSATED SUSPENSION

Richard G. Jewell, Swampscott, Mass., assignor to General Electric Company, a corporation of New York Application September 29, 1955, Serial No. 537,400

6 Claims. (Cl. 308—2)

The present invention relates to improved suspensions for angularly movable elements and, more particularly, to low-friction bearing and pivot arrangements in which net undesired torques due to vibrations are reduced to negligible values.

Perhaps the most common suspension for a member angularly movable in its support is the arrangement wherein a pair of aligned pivot shafts fixed to the member rotate in bearings mounted on the support. When the movable member is part of delicate or sensitive equipment, such as a high-precision measuring instrument, the suspension torque due to frictions must be kept to an absolute minimum. Low-friction bearings and accurately-machined pivots may serve to minimize certain of the frictions resulting from relative angular movements about the axis of support, but it has been found that vibration effects can nevertheless occasion high net torques. These vibration-induced torques occur because of the lateral clearance or "side-play" which pivots must have in their bearings for free turning. Vibrations may cause the pivots to roll around the insides of their bearings, as enabled by such clearance, and thus develop undesired torques.

In accordance with the present teachings, the aforesaid net torques produced by vibration are reduced to negligible values by journal and bearing arrangements which develop only mutually cancelling torques. Loadings, dimensions, and the relationships between journals and bearings are significant, although suitable structures are readily and simply realized. Instrument and other mechanisms including rotatable members which must be free of error-inducing torques can thus be rendered more accurate and sensitive even under the severe vibration conditions encountered aboard aircraft.

One of the objects of this invention is to provide an improved suspension for rotatable members which avoids the effects of vibration-induced torques.

A further object is to provide simple paired journal and bearing assemblies wherein the torques occasioned by vibration are mutually cancelling.

By way of a summary account of one aspect of this invention, a normally-horizontal sensitive rotatable element of an instrument is provided with two spaced and substantially aligned pivot shaft and ring-jewel units which form a low-friction angular suspension for the rotatable element in a relatively stationary support. One of these units includes a pivot shaft fixed with the rotatable element and a mating ring-jewel fixed with the support. The opposite unit includes a like pivot shaft fixed with the support and a like mating ring-jewel fixed with the rotatable element. The radial distances from the axis of rotation of the rotatable member at which the jewels and pivot shafts engage are made the same. The shaft and jewel surfaces are selected such that the coefficients of friction are the same in both suspension units, and the arrangement of parts is further such that the radial loadings upon the units will be equal. When the aforementioned rolling action of pivots and jewels occurs, as a consequence of vibration, the torques developed in the two suspension units are substantially equal and exerted in opposite angular directions, leaving substantially no net torque between the rotatable element and its support.

Although the features of this invention which are believed to be novel are set forth in the appended claims, the fuller details of this invention and the further objects and advantages thereof may be most readily comprehended through reference to the following description taken in connection with the accompanying drawings, wherein:

Figures 1 and 2 are cross-sectional views of pivot and bearing units which may be utilized in one practice of my invention;

Figure 3 illustrates a cross-sectioned portion of a mass rate flowmeter detector embodying the present teachings; and Figure 4 depicts part of a tachometer indicator including my vibration-compensated suspension.

With reference to the Figure 1 illustration, there is displayed in cross-section the usual form of central pivot shaft 1 cooperating with a surrounding ring-jewel 2, the latter being retained in position by a surrounding member 3. Some small radial clearance, which has been exaggerated in the illustration and is identified by reference character 4, is of course necessary to preclude binding between the pivot and jewel, and their centers 5 and 6, respectively, are eccentric. When this unit is employed as one of the two supports for a normally-horizontal rotatable element, with the pivot shaft 1 fixed to the rotatable element and the ring jewel 2 fixed with a stationary support, the pivot shaft 1 will rest upon the lower jewel surfaces, as shown. Vibration tends to cause the rotatable element and shaft 1 to rotate with reference to jewel 2 without actually turning about the center 5. In moving to the dashed-line position 7 in this fashion, such that center 5 is shifted to locus 5', there occurs a rolling movement of shaft 1 which results in torque and rotation in the counterclockwise direction of arrow 8. This rotation of shaft 1 and its affixed rotatable element is highly undesirable because it occasions error in the angular position of the rotatable element.

In avoidance of this error, a unit of the Figure 2 arrangement is utilized in conjunction with that of Figure 1. There, the pivot shaft 9 is fixed with the same support on which jewel 2 of Figure 1 is mounted. The mating ring-jewel 10 is then fixed with the same rotatable element as that to which the pivot shaft 1 in Figure 1 is attached, by way of a surrounding member 11. Center 12 of pivot 9 lies along one support axis with center 6 of the jewel in Figure 1, and center 13 of jewel 10 lies along the axis of rotation of the rotatable element, together with center 5 of the pivot 1 in Figure 1. In both Figures 1 and 2 the views are taken in the same direction along the suspension. Vibration, in the case of the unit of Figure 2, may cause the ring-jewel 10 to rotate about the pivot shaft 9 without actually turning about the axis of centers 13 and 5. A movement of jewel 10 toward dashed-line position 14 and its center to position 13' as pivot 1 of Figure 1 simultaneously moves to position 7 occasions a torque about the axis of the rotatable element and the centers 13 and 5 which is in the clockwise direction of arrow 8'. The two angular restraint forces are experienced at the same radial distance from the axis of rotation of the rotatable element, which is the same as the axis of centers 13 and 5, such that the opposite torques are of equal magnitude and mutually cancelling. The angular position of the rotatable element is thus uninfluenced by the vibration condition.

One instrument construction which advantageously embodies this invention is that of an axial-flow aircraft flowmeter for the measurement of weight of fuel flow per unit of time. A flowmeter of this nature may have a hollow cylindrical casing in which is positioned an upstream cylindrical impeller which has longitudinal peripheral slots and is rotated at substantially a constant speed such that the fluid flowing through it has a substantially uniform linear speed of motion imparted to it in an angular direction about the longitudinal axis of the impeller. A cylindrical turbine element is provided in proximate collinear downstream relationship to the impeller and is likewise constructed to have longitudinal peripheral slots to accommodate fluid flow. The turbine element is intended to deflect angularly about its longitudinal axis against the restraint of a spring, the angular deflections characterizing the mass of fluid flow per unit of time. It is essential that such turbine elements be prevented from deflecting responsive to vibrations and introducing serious measurement errors. In aircraft installations, the vibrations to which such flowmeters may be subjected may be most severe, and accompanying errors having their origins in the turbine bearings can be troublesome when the usual types of bearings are employed. While pre-loaded bearings may prevent vibration-induced torques due to the aforesaid rolling action, the relatively high levels of friction present in such bearings may render them unsuitable for use in many applications.

If desired, further details of flowmeter constructions similar to that described here may be observed in the disclosures of U. S. Patent No. 2,714,310 for "Mass Rate Flowmeter" assigned to the same assignee as that of the present application. In Figure 3, only the downstream portion of a mass flowmeter detector of the above-described arrangement is depicted. Upstream, the cylindrical impeller 15 is rotated within a fluid-tight casing 16 at a constant speed such that fluid passing through the peripheral slots separated by partitions 17 will have a uniform linear speed about the axis 18—18. Downstream cylindrical turbine element 19 is likewise provided with longitudinal peripheral slots, separated by partitions 20, wherein the fluid is reduced in its linear speed about axis 18—18 and causes angular deflection of turbine 19 about axis 18—18 against the restraint of a spiral spring 21 coupled between the turbine and the bracket 22.

Turbine 19 is supported on portions of the downstream bracket 22 for angular movement about the axis 18—18, and angular deflections thereof from a null position are in proportion to the mass rate of fluid flow per unit of time through the detector. An electrical signal generator 23 responds to such deflections by virtue of the coupling between turbine magnets 24 and the follower magnets 25, and may either actuate remote indicators or provide output signals for control initiation purposes, in known ways.

The suspension for angular movement of turbine 19 about axis 18—18 includes two graphite bearings, 26 and 27, and two journal shafts, 28 and 29. Turbine 19 is formed with a central shaft portion 30 which is coaxial with axis 18—18 and at the upstream end of which there is recessed the annular graphite bearing 26. This bearing 26 is fixed with the turbine shaft 30 such that it moves with it. Upstream journal shaft 28 is mated with bearing 26 and is fixed in position upon an upstream part of the downstream bracket 22. At the downstream end of the turbine shaft 30 there is affixed the journal shaft 29 which moves with the turbine shaft and which is mated with the annular graphite bearing 27, the latter being fixedly mounted on part of the downstream bracket 22.

In this flowmeter suspension, the loading on the unit comprising bearing 26 and journal shaft 28 is equal to the loading on the unit comprising bearing 27 and journal shaft 29. Accordingly, the outer diameters of the journal shafts 28 and 29 are made identical, as are the internal diameters of the bearings 26 and 27 also. Coefficients of friction in the two units must also be the same in order that the opposing torques due to vibration will be equal and mutually cancelling. For this reason, the bearings 26 and 27 are made of the same material and the journal shafts 28 and 29 are also made of the same material. Axial lengths over which the bearings and journal shafts come in contact may vary, however, inasmuch as any differences in loadings per unit area for two bearing units will be offset by the differences in the areas over which the loads are impressed. Where unequal loadings are experienced in the two bearing units, the vibration-induced torques will be equalized provided the frictional forces giving rise to the torques are effective at appropriate radii about the suspension axis. The relationship is such that these radii are inversely proportional to loading. For example, with a rotatable element applying twice as much of a load to one bearing unit as to the other, the radius arm at which the journal shaft and bearing engage at the one bearing unit should be half the corresponding radius arm at the other bearing unit.

In Figure 4 a further illustrated construction embodying the present teachings is that of a tachometer indicator of the type employed aboard aircraft to display engine speed data. Within the instrument casing 31 the pointer 32 is angularly deflected against the restraining forces of a spiral 33 which is coupled between the pointer shaft 34 and the instrument frame 35. In the usual manner, the pointer shaft has a suitable torque applied to it by an eddy-current drag disk 36 which interacts with the magnetic field of the rotating magnets 37. Rotation of the magnets 37 is brought about by a synchronous motor, not shown, which drives the shaft 38 at the same speed as a remote generator coupled with an engine.

Bearing support for the rotatable assembly of pointer 32, shaft 34 and drag disk 36 is afforded by the ring-jewels 39 and 40 and by the pivot pin 41 and shaft 34. The bearing unit formed by rotatable shaft 34 and the mating stationary ring-jewel 40 fixed with the frame 35 is of the same type as that portrayed in Figure 1, and the unit comprising pivot pin 41 and ring-jewel 39 is like that of Figure 2, such that ring-jewel 39 moves angularly with shaft 34 while the pin or shaft 41 remains fixed with the instrument frame 35. Rotation of shaft 34, pointer 32 and disk 36 about the axis 42—42 is limited to less than 360 degrees, and the crank-arm portion 43 of shaft 34 serves to actuate pointer 32 while affording the clearance necessary for support of pivot pin 41 upon frame 35 in alignment with axis 42—42. In this construction, the coefficients of friction at the two bearing units are made alike through use of the same materials paired in each unit, and the radial distances from axis 42—42 at which contact is made between the pivot shafts and jewel surfaces at each bearing unit are in inverse proportion to the loading forces at each bearing unit. Severe vibrations will thus introduce no substantial net torques about axis 42—42 which could occasion error in the angular positions of pointer 32. Alternative arrangements utilizing ball bearings, "V" jewels, and other known bearing elements can also be employed in the practice of the present teachings.

The torques arising from vibration can be equalized not only by proportioning the aforesaid radial distances at which contacts are made between the bearings and pivots but also by a proportioning of the coefficients of friction at the two bearing units, or both. For unequal loadings at the two bearing units, the coefficients of friction are selected such that their magnitudes are in inverse proportion to the loadings, with no variation in the aforesaid radial distances. This is simply accomplished by selecting bearing and pivot shaft materials having the desired different coefficient of friction values. Alternatively, the bearing units may be caused to have both different coefficients of friction and different radial distances of frictional engagement from the axis of rotation of the supported member, with either equal or unequal loadings on the two bearing units, with the proportions yielding equal and opposite torques at the two bearing units. In any design, the products of loading, coefficient of friction, and the aforementioned radial distance for the two mated shaft and bearing units are made substantially equal.

The specific embodiments of the invention herein disclosed are, of course, of a descriptive rather than a limiting nature, and various changes, combinations, substitutions or modifications may be employed without departing either in spirit or scope from this invention in its broader aspects.

What I claim as new and desire to secure by Letters Patent of the United States is:

1. A vibration-compensated suspension for members relatively rotatable about an axis comprising a first journal shaft fixed with one of said members and collinear with said axis, a first bearing fixed with the other of said members, said journal shaft being mated in said bearing with a radial clearance permitting low-friction rotation of said shaft in said bearing about said axis, a second bearing fixed with said one member coaxially with said axis, and a second journal shaft fixed with said other member and mated in said second bearing with a radial clearance permitting low-friction rotation of said second bearing about said second journal shaft, said first bearing and first journal shaft having substantially the same coefficient of friction as said second bearing and second journal shaft, and the radial distance from said axis at which said first shaft engages said first bearing and at which said second bearing engages said second shaft being in inverse proportion to the loadings thereon.

2. A vibration-compensated suspension for members relatively rotatable about an axis comprising a first journal shaft fixed with one of said members collinearly with said axis, a second journal shaft fixed with the other of said members in axially spaced relationship to said first shaft, said journal shafts being made of the same material, a first bearing fixed with the other of said members, said first journal shaft being mated in said bearing with a radial clearance permitting low-friction rotation of said first journal shaft in said bearing about said axis, and a second bearing made of the same material as said first bearing and fixed with said one member coaxially with said axis and in axially spaced relationship to said first journal shaft, said second journal shaft being mated in said second bearing with a radial clearance permitting low-friction rotation of said second bearing about said second journal shaft, the radial distance from said axis at which said first journal shaft engages said first bearing being substantially the same as that at which said second bearing engages said second shaft, and said bearings being positioned to support equal loads imposed by said one member.

3. A vibration-compensated suspension for a member angularly movable in a support about an axis comprising a bearing and a journal shaft angularly movable with said member about said axis and positioned in a coaxial and spaced relationship along said axis, and a stationary journal shaft and bearing fixed with said support in a spaced relationship, said stationary and movable journal shafts being mated with and having the same coefficient of friction with said movable and stationary bearings, respectively, and the radial distances from said axis at which said movable journal shaft engages said stationary bearing and at which said movable bearing engages said stationary journal shaft being in inverse proportion to the loadings thereon.

4. A vibration-compensated suspension for a member angularly movable in a support about an axis comprising a pair of low-friction bearing units each having the same coefficient of friction between the mating journal shaft and bearing thereof, one of said bearing units including a journal shaft angularly movable with said member and a bearing fixed upon said support, and the other of said bearing units including a journal shaft fixed with said support and a bearing angularly movable with said member coaxially with said journal shaft of said one bearing unit, said bearing units being spaced apart along said axis and the radial distances from said axis at which said bearings and shafts engage being substantially in inverse proportion to the loadings thereon, whereby torques on said member about said axis due to vibration-induced rolling between said shafts and bearings are mutually cancelling.

5. A vibration-compensated suspension for a member angularly movable in a support about an axis comprising a pair of low-friction bearing units spaced along said axis and each having the same coefficient of friction between a mating journal shaft and annular bearing thereof, one of said bearing units including an annular bearing fixedly mounted on said support and a journal shaft angularly movable with said member about said axis and mated in said bearing with a radial clearance affording low-friction relative angular movement, and the other of said bearing units including another annular bearing mounted on said member for angular movement therewith coaxially with said axis and a journal shaft fixedly mounted on said support and mated in said other bearing with a radial clearance affording low-friction relative angular movement, the radial distances from said axis at which said angular bearings and journal shafts engage being substantially in inverse proportion to the loadings thereon whereby torques on said member about said axis due to vibration-induced rolling between said journal shafts and bearings are mutually cancelling.

6. A vibration-compensated suspension for members relatively rotatable about an axis comprising a bearing and a journal shaft angularly movable with one of said members about said axis and positioned in a coaxial and spaced relationship along said axis, and a stationary journal shaft and bearing fixed with the other of said members in a spaced relationship, said stationary and movable journal shafts being mated with said movable and stationary bearings, respectively, and having predetermined coefficients of friction therewith, and the radial distances from said axis at which said movable shaft engages said stationary bearing and at which said stationary shaft engages said movable bearing being in a predetermined relationship, the products of loading, coefficient of friction, and said radial distance for each of said mated shafts and bearings being substantially equal.

References Cited in the file of this patent
UNITED STATES PATENTS
2,714,310    Jennings _____ Aug. 2, 1955